Sept. 7, 1937.  C. C. FARMER  2,092,416
BRAKING SYSTEM
Filed July 17, 1936  3 Sheets-Sheet 1
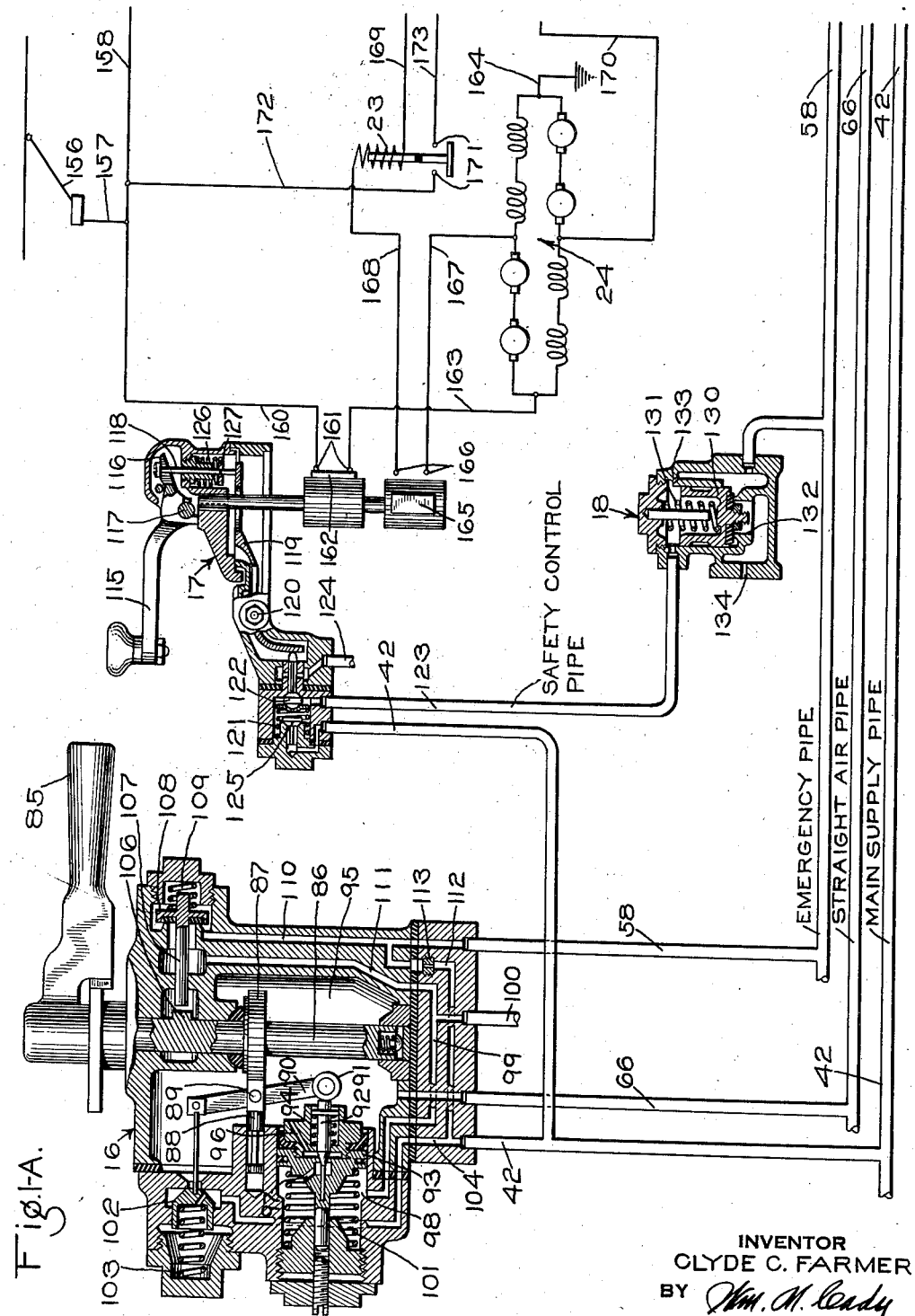
Fig.1-A.
INVENTOR
CLYDE C. FARMER
BY *Wm. M. Cady*
ATTORNEY

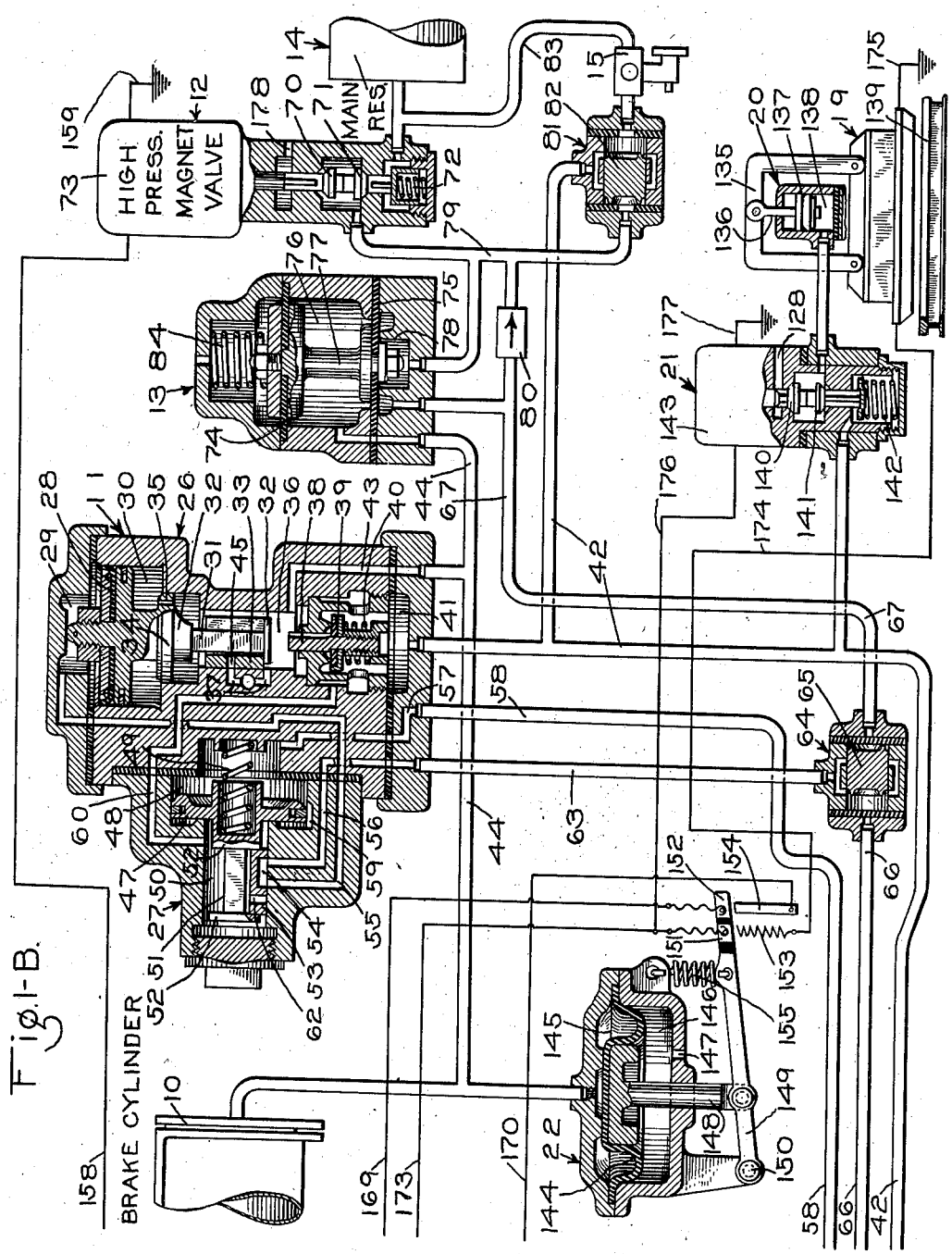

Sept. 7, 1937.  C. C. FARMER  2,092,416
BRAKING SYSTEM
Filed July 17, 1936   3 Sheets-Sheet 3
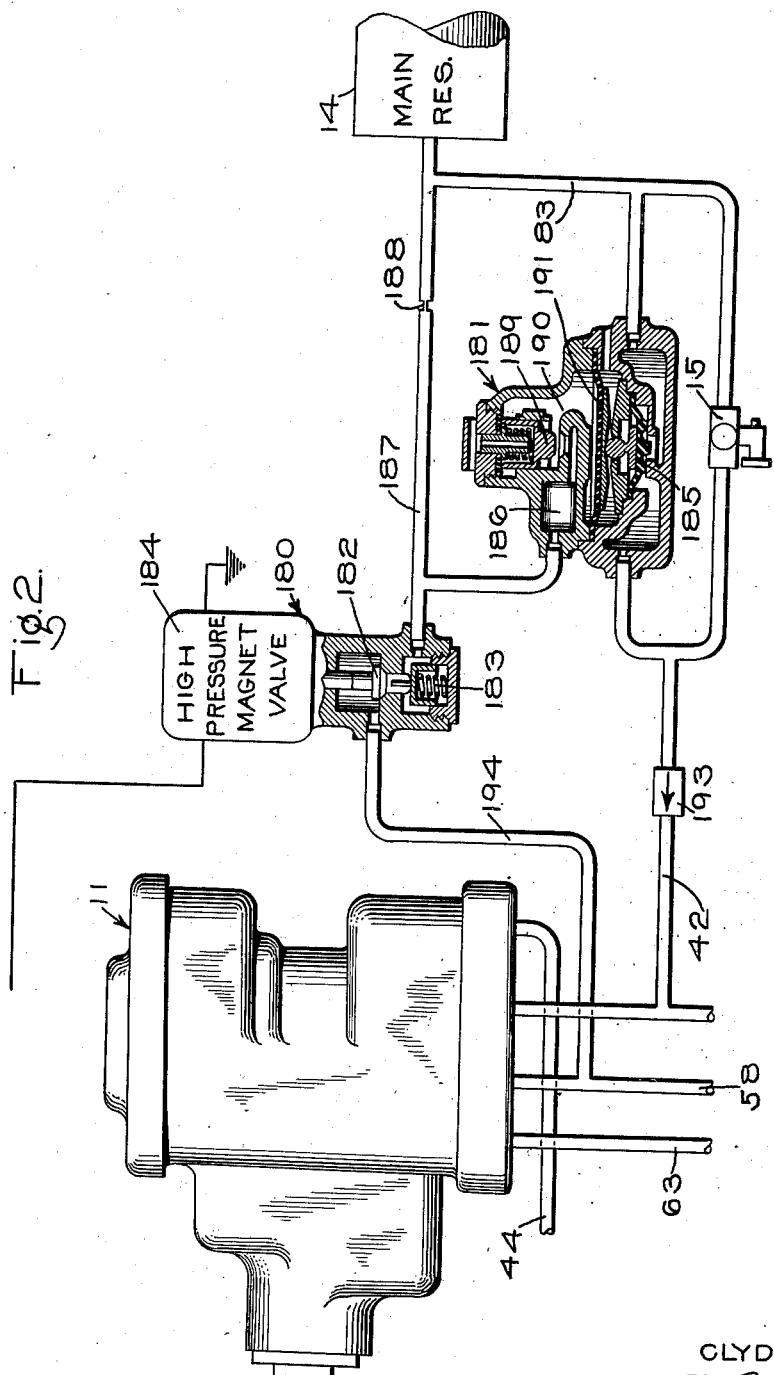
INVENTOR
CLYDE C. FARMER
BY  *Wm. M. Cady*
ATTORNEY Patented Sept. 7, 1937

2,092,416

UNITED STATES PATENT OFFICE 2,092,416

BRAKING SYSTEM

Clyde C. Farmer, Pittsburgh, Pa., assignor to The Westinghouse Air Brake Company, Wilmerding, Pa., a corporation of Pennsylvania Application July 17, 1936, Serial No. 91,036

13 Claims. (Cl. 303—3)

This invention relates to braking systems for traction vehicles and railway trains, and more particularly to braking systems employing both fluid pressure brakes and magnetic track brakes.

Certain types of modern traction and railway vehicles are provided with rubber inserts between the wheel treads and wheel hubs in order to minimize the noise transmitted to the vehicle body, for the purpose of producing a quieter operating vehicle. Where such rubber inserts are employed the degree of braking which is permissible on the wheel treads for repeated applications must be limited, because if the wheel treads are permitted to become over-heated the rubber inserts may be wholly destroyed or damaged beyond usefulness. Since the degree of braking on the wheel treads must be thus limited, other brake means must be employed to produce sufficient braking to stop the vehicle with reasonable promptness.

A preferred type of auxiliary brake means is the magnetic track brake. This type of brake employs one or more magnetic track brake devices which are normally suspended above the track rail in their release or inoperative position, and are caused to engage the rails in their application position, the exciting windings of the brake devices being at the same time energized so that a braking effect is produced on the track rails.

In brake equipments for the new quiet type vehicles which employ both fluid pressure operated brakes and magnetic track brakes, the control is preferably so arranged that for repeated normal or service applications the degree to which the wheel brakes is applied is limited or suppressed, while the magnetic track brakes are conditioned to perform a larger than usual share of the braking. In this manner the heating of the wheel treads, due to braking thereon, is kept to a minimum and the life of the rubber inserts is greatly prolonged. Where, however, there is a failure of the electric power source available for energizing the magnetic track brakes it is desirable that the fluid pressure brakes be applied to a greatly increased degree, to compensate for the loss of track braking.

A principal object of the present invention is to provide a brake system employing both fluid pressure brakes and magnetic track brakes, in which the degree of application of the fluid pressure brakes is limited to relatively lower values when making either service or emergency applications, but which provides for a greatly increased degree of application in the event that the electric power supply for the magnetic track brakes should fail.

A further object of the present invention is to provide a brake equipment of the above referred to character in which the pressure of fluid supplied for operating the fluid pressure brakes is normally limited to moderate values, but which is increased instantly to a considerably larger value upon failure of the electric power supply for the magnetic track brakes.

A still further object of the invention is to provide a braking system of the aforementioned character in which improved means are provided for responding to a failure of the electric power supply to condition the fluid pressure brake portion of the system for an application to a maximum degree.

Further objects of the invention dealing with arrangements and associations of related parts will be more clearly understood from the following description of two embodiments of the invention, which are taken in connection with the attached drawings, wherein, Figs. 1A and 1B, when taken together and placed end to end, illustrate in schematic and diagrammatic form one embodiment of the invention.

Fig. 2 shows a modification which may be made to the braking system of Figs. 1A and 1B, and thus illustrates another form of the invention.

Referring now to Figs. 1A and 1B, and considering the brake system thus illustrated briefly at first, I have represented the wheel brakes by the single brake cylinder 10 (although any number may be used), which may be employed to operate any of the conventional type wheel brakes. A control valve device 11 is provided for controlling the supply of fluid under pressure to the brake cylinder 10. A high pressure magnet valve device 12 and a compensating valve device 13 cooperate to make available high fluid pressures upon failure of the electric power supply.

The main source of supply of fluid under pressure is from a main reservoir 14, which is connected to a suitable compressor (not shown), but the supply for normal brake applications is regulated by a feed valve device 15 of conventional design.

A brake valve device 16 is provided for manually controlling applications of the brakes, while a "deadman control" is embodied in the motor controller, diagrammatically shown at 17, which cooperates with an application valve device 18.

The magnetic track brake apparatus comprises at least one track brake device 19, which may be of conventional design, a raising cylinder 20 therefor, and a magnet valve device 21 for controlling the supply of fluid under pressure to and its release from the raising cylinder. A fluid pressure operated rheostat device 22 is employed to control the degree of energization of the track brake device 19.

In order to deenergize the track brake device at about the time the vehicle or train comes to a stop, and thus minimize the danger of overheating of the track brake device, there is provided a cut-out relay 23, the energization of which is controlled by the vehicle motors diagrammatically indicated at 24.

Considering now more in detail the devices above enumerated, the control valve device 11 comprises a relay portion 26 and an emergency valve portion 27.

The relay valve portion 26 is embodied in a casing provided with a piston 28 which is subject on one side to pressure of fluid in a chamber 29 and on its other side to pressure of fluid in a chamber 30. Attached to the piston is a stem 31 provided with shoulders or collars 32 for operating a slide valve 33 with a lost motion movement. For guiding the movement of the piston and slide valve there is provided a guiding element 34 slidable in a coacting bore, and provided with a small port 35 for providing communication between the chamber 30 and slide valve chamber 36.

Upon inward (downward) movement of the piston 28 the slide valve 33 will be actuated to blank exhaust ports 37, and after these ports are blanked the end of stem 31 will engage the stem 38 of the valve 39 and unseat the valve against the bias of its spring 40. This establishes a communication between a supply chamber 41 (which is connected to main supply pipe 42) and the slide valve chamber 36, which by way of passage 43 is connected to brake cylinder pipe 44. Fluid under pressure will then flow from the supply pipe 42 and chamber 41 to the brake cylinder 10. Fluid under pressure in chamber 36 will flow also through port 35 to chamber 30, and when the pressure in chamber 30 equals or slightly overbalances the pressure in chamber 29 piston 28 will move outwardly until the valve 39 is seated by spring 40. The supply to the brake cylinder 10 will be then lapped.

If the pressure in chamber 29 is subsequently reduced, then piston 28 will move outwardly (upwardly) far enough for slide valve 33 to uncover the one exhaust port 37 and for port 45 in the slide valve to register with the other exhaust port 37. Fluid under pressure will then be released from the brake cylinder 10. It will, of course, be obvious that if the pressure in chamber 29 is varied in any other manner the brake cylinder pressure will correspondingly vary.

While the relay valve portion 26 has been shown in a vertical position, it is preferably disposed horizontally when installed on a vehicle.

The emergency valve portion 27 is embodied in a casing having a piston 47 subject on one side to the combined pressure of fluid in a chamber 48 and that of a biasing spring 49, and subject on its other side to pressure of fluid in a slide valve chamber 50. Attached to the piston 47 is a stem 51 having collars 52 thereon adapted to actuate a slide valve 53 coextensive with movement of the piston 47. In the release position of the piston 47, as illustrated, a cavity 54 in the slide valve 53 connects two passages 55 and 56.

The chamber 48 is connected by passage 57 to an emergency pipe 58 which, in the release position of piston 47, is charged by way of feed groove 59 around the piston. The slide valve chamber 50 is connected by a passage 60 to the aforementioned chamber 41, which is open to the supply pipe 42.

Upon a sudden decrease of pressure in the piston chamber 48, piston 47 moves to its extreme outward position (to the right), carrying with it the slide valve 53. The slide valve then disconnects passage 55 from passage 56, and a port 62 in the slide valve registers with the passage 55, so that fluid under pressure may flow from chamber 50 into this passage. It will be noted that the passage 55 leads to the relay piston chamber 29, while the passage 56 leads by way of pipe 63 to a double check valve device 64. Upon restoring the pressure in the piston chamber 48, the piston 47 and slide valve 53 will return to the illustrated positions, thus reconnecting the double check valve device 64 with the relay piston chamber 29.

The double check valve device 64 is embodied in a casing having disposed therein a slide valve 65 which operates to selectively connect to the pipe 63 either a straight air pipe 66 or a high pressure pipe 67, depending upon in which of the two pipes 66 and 67 the pressure of the fluid supply is the greater.

The high pressure magnet valve device 12 is embodied in a casing provided with a release valve 70 and a supply valve 71 arranged in abutting relationship. A spring 72 urges the supply valve 71 toward unseated position and the release valve 70 toward seated position. An electromagnet 73 in the upper part of the valve device casing functions when energized to hold the release valve 70 unseated and the supply valve 71 seated.

The compensating valve device 13 is embodied in a casing having suitably disposed therein two flexible diaphragms 74 and 75 so arranged as to define therebetween a pressuretight chamber 76. The two diaphragms are provided with the usual follower plates and are rigidly interconnected by a stem 77, so that as one diaphragm moves the other moves also. A spring 84 acting on the one side of the diaphragm 74 biases the two diaphragms to a position such that diaphragm 75 seats on a seat rib 78. This closes a communication between the aforementioned high pressure pipe 67 leading to the double check valve device 64 and another pipe 79 leading to the high pressure magnet valve device 12.

The spring 84 is strong enough to maintain the diaphragm 75 seated on seat rib 78 for the highest pressure of fluid which may be established below the diaphragm 75 within the seat rib 78. The chamber 76 is, however, connected to the brake cylinder pipe 44, so that when a predetermined brake cylinder pressure is obtained the differential of pressure acting on the diaphragm 74, together with the pressure acting below the diaphragm 75 within the seat rib 78, will unseat the diaphragm 75 and thus establish communication from the pipe 79 to the pipe 67.

It will be noted that a one-way check valve device 80 provides a one-way communication from the pipe 67 to the pipe 79. The purpose of this will be clear later.

The main supply pipe 42 may be selectively in communication with the feed valve device 15 or the aforementioned pipe 79 by way of a second double check valve device 81. Like the aforedescribed check valve device 64, this check valve is embodied in a casing having a slide valve 82 therein which is actuated to the left or the right depending upon whether the pressure of fluid delivered by the feed valve device 15 or that delivered by the pipe 79 is the greater. As will be noted, the feed valve device 15 is connected by a pipe 83 directly to the main reservoir 14, while the pipe 79 may be connected to the main reservoir only when the supply valve 71 of the high pressure magnet valve device 12 is unseated.

Considering now the brake valve device 16, this device is provided with an operating handle 85, which according to conventional practice is movable from a release position different degrees into a service application zone, and beyond this zone to an emergency position.

As the handle is moved from release position it rotates a shaft 86 having rigidly disposed thereon a cam 87. This cam is so designed that as the handle is rotated into the service application zone it progressively shifts a plunger 88 to the left. Carried by the plunger and pivotally connected thereto at 89 are two spaced levers 90. The lower ends of these two spaced levers carry a roller 91 which engages the outer end of a release valve 92. This release valve 92 is disposed interiorly of a movable abutment 93 in the form of a piston, and is normally urged to an unseated position by a spring 94.

Upon the inward (left) movement of the plunger 88 the spaced levers 90 will pivot about their upper ends and rotate in a clockwise direction to seat the release valve 92, thus closing communication between a pressure chamber 95 and the atmosphere, which communication leads by way of passage 96, past the unseated release valve 92, passage 97, spring chamber 98, passage 99 and exhaust pipe 100. The movable abutment 93 is during this operation held in the illustrated position by a regulating spring 101.

When the release valve 92 has been seated the spaced levers 90 will fulcrum about their lower ends and rotate in a counterclockwise direction to unseat a supply valve 102 against the bias of its spring 103, which spring is a much stronger spring than the release valve spring 94. Unseating of the supply valve 102 opens a communication between the main supply pipe 42 and the pressure chamber 95, by way of passage 104. The pressure chamber 95 is connected directly with the straight air pipe 66 so that fluid under pressure flows to this pipe.

As the pressure builds up in the chamber 95 it acts upon the right side of the movable abutment 93 and progressively compresses the regulating spring 101. This causes the spaced levers 90 to fulcrum about their mid-point and rotate in a clockwise direction under the action of the supply valve spring 103 until the supply valve 102 is seated. The parts are so designed that the pressure at which the supply valve 102 seats corresponds substantially to the degree or extent of movement of the handle 85 into the service application zone. It will thus be obvious that the pressure established and maintained in the pressure chamber 95, and in the straight air pipe 66, corresponds to the position of the handle 85 in the service application zone.

When the handle 85 is moved to the emergency position the valve mechanism described will be conditioned to establish the maximum pressure in the pressure chamber 95, and at the same time another cam 106 on the shaft 86 engages the stem 107 of an emergency vent valve 108 to unseat this valve against the bias of spring 109. Unseating of this valve establishes a communication between the emergency pipe 58 and the exhaust pipe 100 by way of passage 110, past the unseated vent valve 108 and passage 111. The pressure in the emergency pipe will thus be reduced as the venting takes place.

It will be noted that a passage 112 and a choke 113 provide a charging communication from the main supply pipe 42 to the emergency pipe 58, so that the emergency pipe may be recharged by way of this communication when the venting communication is closed. The choke 113 prevents undue loss of fluid under pressure from the charging source when the emergency pipe is being vented.

The motor controller mechanism 17 is provided with an operating handle 115 which in addition to having several rotative motor controlling positions also has an up position and a down position for controlling the brakes. The controller handle is illustrated in its down position, in which position an extension 116 of the handle, beyond its fulcrum point 117, lifts a stem 118 to permit a bale 119 to be rotated about its fulcrum point 120 by a spring 121, so as to seat a release valve 122. The seating of this release valve closes a communication between a safety control pipe 123 and an exhaust pipe 124. At the same time, a supply or charging valve 125, which is subject to the pressure of fluid in the main supply pipe 42, unseats to permit the safety control pipe 123 to be charged from the main supply pipe.

The motor controller handle 115 is held in its down position by the operator at all times while the vehicle is running. If, however, through accident or design the operator should release the handle 115 a spring 126 acting upon a collar 127 secured to the stem 118 would move the handle to its upper position, whereupon the stem 118 would rock the bale 119 about its fulcrum 120 to unseat the release valve 122 and seat the charging valve 125. The safety control pipe 123 would thus be vented to the atmosphere.

Connected to the safety control pipe is the application valve device 18. This valve device is embodied in a casing having a valve 130 therein in the form of a piston which is subject on its uppermost side to safety control pipe pressure and also the pressure of a biasing spring 131. A restricted passage 133 forms a communication between the chamber above the valve and the emergency pipe 58. When the safety control pipe is charged the valve 130 is held upon a seat 132.

When the safety control pipe pressure is suddenly reduced, the overbalancing pressure acting on the under side of the valve 130, outside the seat rib 132, will actuate the valve upwardly, establishing communication between the emergency pipe 58 and an exhaust port 134, and also closing the restricted communication 133 between the chamber above the valve and the emergency pipe. When the emergency pipe pressure has been reduced to a low value the spring 131 will again seat the valve 130.

Considering now the magnetic track brake apparatus, each of the track brake devices 19 is provided with a yoke member 135 secured thereto and secured to a stem 136 of a piston 137 in its associated raising cylinder 20. When fluid under pressure is supplied to chamber 138 below piston 137 the associated track brake device 19 will be held suspended above track rail 139. When the pressure in the chamber 138 is reduced substantially to atmospheric pressure, the force of gravity will cause the track brake device 19 to drop to engagement with the track rail 139.

The magnet valve device 21, which controls the supply of fluid under pressure to and its release from the raising cylinder 20, is embodied in a casing having a release valve 140 and a supply valve 141 arranged in abutting relationship, as illustrated. A spring 142 urges the supply valve 141 toward unseated position and the release valve 140 toward seated position. When the supply valve 141 is unseated and the release valve 140 is seated, fluid under pressure is supplied from the main supply pipe 42 to the chamber 138 in the raising cylinder 20.

In the upper part of the magnet valve device casing is an electromagnet 143, which when energized actuates the supply valve 141 to seated position, to cut off the supply of fluid under pressure to the raising cylinder 20, and also actuates the release valve 140 to unseated position, to vent the raising cylinder 20 to the atmosphere by way of exhaust port 128.

The track brake rheostat device 22 is embodied in a casing having disposed therein a flexible diaphragm 144 subject on its uppermost side to pressure of fluid supplied to a chamber 145 and on its lowermost side to atmospheric pressure in a chamber 146, which is always open to the atmosphere by way of port 147.

Operatively connected to the diaphragm 144 by a stem 148 is an arm 149 pivoted at one end on a pin 150. Carried by the other end of the arm and insulated therefrom, and from each other, are two contact members 151 and 152. The contact member 151 is adapted when actuated downwardly to cut out sections of a resistance 153 while the contact member 152 at the same time engages and maintains contact with a stationary contact member 154.

The arm 149 is normally biased to the illustrated position by a spring 155. The chamber 145 is connected to the brake cylinder pipe 44, and consequently as the brake cylinder pressure increases the arm 149 is actuated downwardly to a corresponding degree.

The description of the relay 23 and its functioning in connection with the vehicle motors 24, and the operation of the motor controller 17, is best understood from a description of the operation of this embodiment of my invention, which now follows:

Running condition

When a vehicle or train equipped with the embodiment of my invention just described is running, the operator maintains the brake valve handle 85 in release position, and at the same time maintains pressure manually applied to the motor controller handle 115 so as to maintain this handle in its down position.

In order to more clearly describe the operation of my invention reference will be had to specific fluid pressures, but it is to be understood that these are used for illustrative purposes only. Assuming now that the main reservoir 14 has been charged to a pressure of eighty pounds (per square inch) or greater, and that the feed valve 15 has been set to deliver fluid at fifty-five pounds (per square inch) pressure, the main supply pipe 42 will be charged to feed valve pressure, and the emergency pipe 58 will be charged from the main supply pipe through the brake valve device 16 by way of passage 112 and choke 113, as previously described, and also by way of feed groove 59 in the control valve device 11. At the same time, when the motor controller handle 115 is in its down position, the safety control pipe 123 will be similarly charged past the charging valve 125.

The track brake devices 19 will be held suspended above the track rail 139, as the magnet valve device 21 is at this time deenergized.

The high pressure magnet valve device 12 is at all times connected to trolley 156 by way of conductors 157 and 158, the return connection to the source of power supply being by way of ground conductor 159. The supply valve 71 in the high pressure magnet valve will thus be held seated, while the release valve 70 will be held unseated.

The other parts will be in the positions as illustrated.

Normal service application

The motor controller 17 has been illustrated in the "power on" position, in which position the trolley 156 is connected to the vehicle motors 24 by way of conductors 157 and 160, contact fingers 161 and drum contact 162, and conductor 163, the return connection to the source of power supply being by way of ground conductor 164. In order to make a service application of the brakes the operator first moves the motor controller handle 115 to the "power off" position, in which position the drum contact 162 disengages from the contact fingers 161, thereby interrupting the power supply to the vehicle motors 24, and at the same time drum contact 165 engages contact fingers 166. This partially establishes a circuit from the vehicle motors 24, which will now operate as generators, to the relay 23, this circuit including conductor 167, contact fingers 166 and drum contact 165, conductor 168, the relay 23, conductor 169, now open contacts 152 and 154 of the track brake rheostat 22, and conductor 170.

The operator then moves the brake valve handle 85 out of release position into the service application zone to a degree or extent according to the desired degree of application of the brakes. Fluid under pressure will then be supplied to the straight air pipe 66 dependent upon the degree of movement of the brake valve handle. From the straight air pipe 66 fluid under pressure will flow to the double check valve device 64, where it will shift the slide valve 65 to the right as illustrated, and then flow by way of pipe 63, passage 56, cavity 54, passage 55, to the relay valve piston chamber 29. The pressure thus established in chamber 29 will actuate the piston 28 inwardly to close the brake cylinder exhaust communication and to unseat the valve 39, to supply fluid under pressure from the main supply pipe 42 to the brake cylinder. The brake cylinder pressure will be lapped when it corresponds to the straight air pipe pressure, the degree of the wheel brake application thus corresponding to the brake valve handle position.

Fluid under pressure flowing to the brake cylinder 10 also flows to the track brake rheostat 22, where it acts upon the diaphragm 144 to move the arm 149 downwardly. As the arm 149 moves downwardly contact 152 engages contact 154 to complete the circuit through the relay 23, thus causing the relay to close its contacts 171. Closing of these contacts establishes a circuit to the track brake device 19, which beginning at the trolley 156 includes conductor 157 and 172, relay contacts 171, conductor 173, now closed contact 151, a portion of resistance 153, and conductor 174, the return connection to the source of power supply being by way of ground conductor 175.

At the same time, the closing of relay contacts 171 also establishes a circuit by way of conductor 176 to the magnet valve device 21, its return connection being by way of ground conductor 177.

This magnet valve device then seats its supply valve 141 and unseats its release valve 140. Fluid under pressure will thus be released from the raising cylinder 20, and the track brake device 19 will drop to engagement with the rail 139 due to the force of gravity.

It will thus be seen that operation of the brake valve handle 85 into the service application zone effects an application of both the fluid pressure brakes and the magnetic track brakes.

In order that the rubber inserts in the wheels shall not be damaged due to excessive overheating resulting from braking on the wheels, I prefer to arrange the parts so that during a service application of the brakes the braking load is shared approximately equally between the wheel brakes and the track brakes. Further and with respect to the fluid pressures heretofore mentioned, I have in practicing my invention found it desirable to limit (by properly designing the brake valve 16) the brake cylinder pressure which may be established by movement of the brake valve handle into the service zone to a maximum of forty pounds. By thus limiting the brake cylinder pressure the danger of damaging the rubber inserts in the wheels due to repeated service applications of the brakes is greatly minimized.

As the vehicle is decelerating under action of the brakes the magnetic track brakes will be automatically cut out of action at a low vehicle speed regardless of the brake cylinder pressure obtaining. This is accomplished by the deenergization of the relay 23 due to the decreasing voltage output of the vehicle motors 24 with the decrease in speed. The relay 23 is preferably so designed that when the speed of the vehicle diminishes to approximately five or six miles per hour, at which time the voltage output of the motors will be low, it will open its contacts 171 and thereby effect a full release of the track brakes.

When it is desired to release the brakes following a service application, the brake valve handle 85 is returned to the release position, in which position the straight air pipe is vented to the atmosphere, and correspondingly the pressure in the brake cylinder 10 and chamber 145 of the track brake rheostat is reduced.

When switching the vehicle or train about terminal yards it is not desirable or necessary to apply the track brakes. Generally speaking, sufficient braking can be obtained with the wheel brakes alone, even with brake cylinder pressures of fifteen pounds or less. I therefor prefer to arrange the track brake rheostat (by initially tensioning the spring 155) so that for brake cylinder pressures below fifteen pounds the track brake windings will be deenergized. Thus brake cylinder pressures below fifteen pounds may be employed without applying the magetic track brakes.

Normal emergency application

When it is desired to effect an emergency application of the brakes, this may be accomplished by moving the brake valve handle 85 to the emergency position, and thereby directly venting the emergency pipe 58 past the vent valve 108, or by releasing the motor controller handle 115 and permitting it to swing upwardly, and thus venting the emergency pipe indirectly by first venting the safety control pipe 123. In either case the subsequent reduction of emergency pipe pressure which results causes the emergency valve piston 47 to move to its extreme outer (right hand) position, and thus connect the slide valve chamber 50 and main supply pipe 42 to the relay valve piston chamber 29. Since the pressure maintained in the main supply pipe 42 is fifty-five pounds, as compared to the maximum of forty pounds delivered by the brake valve device 16 in the service application zone, it follows that the brake cylinder pressure which may be established during an emergency application will be approximately fifty-five pounds.

Concomitantly, the track brake rheostat 22 will be operated to increase the degree of energization of the track brakes, so that the total degree of braking is greater than for any service application.

If the emergency application was effected by manipulation of the brake valve handle 85, a release may be effected by returning the brake valve handle to its release position and thus closing the communication between the emergency pipe 58 and the atmosphere, and permitting the emergency pipe to be recharged by way of the choke 113.

If the emergency application was effected as a result of upward movement of the controller handle 115, the release may be effected by moving this handle to its down position, thus seating the release valve 122 and permitting the safety control pipe to be recharged from the main supply pipe past the charging valve 125. Valve 130 in the application valve device 18 will thus be held in a seated position, so that the emergency pipe can be charged through the brake valve choke 113.

As the pressure in the emergency pipe builds up emergency piston 47 will return to the illustrated or release position, whereupon fluid under pressure in the relay valve chamber 29 will be released to the atmosphere through the straight air pipe 66 and past the release valve 92 in the brake valve. This will, of course, effect a release of fluid under pressure from the brake cylinder 10 and from the track brake rheostat 22, thus releasing both the wheel brakes and the magnetic track brakes, if the track brakes have not already been released due to operation of relay 23.

Applications with electric power supply off

As long as the electric power supply is available the high pressure magnet valve device 12 will remain energized. The maximum degree of application of the fluid pressure brakes is therefore limited to the pressure of fluid supplied by the feed valve device 15, namely fifty-five pounds.

If the source of electric power supply should fail, or if the trolley 156 should disengage from the trolley wire, the high pressure magnet valve device 12 will be deenergized, and spring 72 therein will unseat the supply valve 71 and seat the release valve 70. This will permit fluid at main reservoir pressure to flow past the valve 71 to the pipe 79, and from thence to the small area of the diaphragm 75 in the compensating valve device 13 within the seat rib 78. As before described, the spring 84 is strong enough to hold the diaphragm 75 seated on the seat rib 78 against full main reservoir pressure so long as only this small area is exposed to the high pressure.

From pipe 79 fluid under pressure also flows to the double check valve device 81 where it shifts the slide valve 82 to the right and flows to the main supply pipe 42. There is then available for effecting an application of the brakes fluid at a pressure of eighty pounds or greater.

If now the operator desires to effect either a service or an emergency application of the brakes he suitably manipulates the brake valve handle 85, or permits the controller handle 115 to be moved to its upper position. The diaphragm 75 in the compensating valve device 15 will remain in the seated position illustrated until the pressure in brake cylinder pipe 44 has risen to some predetermined value sufficient to exert an upward differential of pressure on diaphragm 74 to unseat the diaphragm 75. When this takes place fluid at main reservoir pressure flows past the unseated diaphragm 75 and to the high pressure pipe 67. From pipe 67 the flow is to the double check valve device 64, in which the slide valve 65 is shifted to the left and fluid then flows through pipe 63 and the passages heretofore described to the relay piston chamber 29. The relay valve will then function to establish a maximum brake cylinder pressure, which will correspond substantially to main reservoir pressure, namely eighty pounds or greater. The fluid pressure brakes will be thus applied to the maximum possible degree.

Although fluid under pressure also flows to the track brake rheostat device 22 this device will not perform any useful function at this time because of the lack of available electric power for energizing the track brakes.

After an application of the brakes has been thus effected with the electric power supply off a release cannot be effected until the electric supply is again available to energize the high pressure magnet valve device 12, as the slide valve 65 of the double check valve 64 is maintained in the left hand position due to the high pressure of the supply from pipe 67, and brake cylinder pressure cannot be reduced by manipulation of the brake valve handle 85.

When the high pressure magnet valve device 12 is again energized, it seats its supply valve 71 and unseats its release valve 70. Fluid under pressure is then released from the face of the relay valve piston 28 through the double check valve 64, the one-way check valve device 80 and exhaust port 178 in the high pressure magnet valve. In the double check valve device 81 the slide valve 82 will shift to the left as soon as the pressure in pipe 79 drops below the feed valve setting.

Thus once an application of the brakes has been effected with the electric power off, whether a service application or an emergency application, it cannot be released until electric power returns.

Modification of Fig. 2

The modification shown in Fig. 2 has to do principally with the employment of a new and different arrangement for making available the higher main reservoir pressure upon loss of electric power supply, and which permits a release at the brake valve. In this embodiment the control valve device 11 of the previous embodiment, the same main reservoir 14 charged to the same degree as before, and the same feed valve device 15 set for the same pressure value as before are all retained. A new high pressure magnet valve device 180 and a new compensating valve device 181 replace the high pressure magnet valve device 12 and compensating magnet valve device 13 of the previous embodiment.

The high pressure magnet valve device 180 is embodied in a casing having a single supply valve 182 urged toward an unseated position by a spring 183 and toward a seated position by an electromagnet 184.

The compensating valve device 181 is embodied in a casing having a valve 185 which when unseated provides a by-pass communication around the feed valve device 15, as illustrated, and when seated closes this by-pass communication. The compensating valve device is also provided with a chamber 186 which is connected by way of pipe 187 and choke 188 to the main reservoir 14. When the pressure of fluid in pipe 187 and chamber 186 is above a predetermined value, as for example thirty-five pounds, a valve 189 will be actuated to upper seated position to open communication between chamber 186 and a chamber 190 above a diaphragm 191. Diaphragm 191 will be then actuated downwardly to seat the valve 185.

When the pressure in chamber 186 and pipe 187 is reduced below the said predetermined value, valve 189 will move downwardly to cut off supply to and vent the chamber 190, whereupon the diaphragm 191 will move upwardly and the valve 185 will be unseated. This will then permit fluid at main reservoir pressure to by-pass the feed valve device 15 and flow to the main supply pipe 42 through the one-way check valve device 193.

As long as the high pressure magnet valve device 180 remains energized pressure in pipe 187 and chamber 186 will be maintained at main reservoir pressure and valve 185 will be held seated. When however the high pressure magnet valve device is deenergized, as due to a loss of power supply or the trolley coming off, the valve 182 will be unseated and the pressure in pipe 187 and chamber 186 may be reduced, as will be now explained.

Connected to the high pressure magnet valve device above the valve 182 is a pipe 194 leading to the emergency pipe 58. Therefore, if after the high pressure magnet valve device has been deenergized an emergency application of the brakes should be effected, by reducing the pressure in the emergency pipe 58, the pressure in pipe 187 and chamber 186 would also be reduced by the flow of fluid past the valve 182 to the emergency pipe 58 and from thence to the atmosphere. The pressure in pipe 187 and chamber 186 would reduce faster than the resupply through choke 188 takes place, so that valve 185 in the compensating valve device would unseat and permit fluid at main reservoir pressure to flow to main supply pipe 42. An emergency application of the fluid pressure brakes would thus be effected to the maximum possible degree provided by main reservoir pressure.

In case it is desired to release the application, even though the electric supply remains cut off, this may be done by again charging the emergency pipe 58 and thus effecting the release as for the previously described emergency application. The emergency pipe will, of course, remain in communication with the main reservoir 14, so long as the high pressure magnet valve device remains deenergized. This may cause the emergency pipe to be charged to a degree higher than the setting of the feed valve device 15, but this is not undesirable.

It will be seen therefore that in the embodiment of Fig. 2 the higher fluid pressure is available only for emergency applications, but a release may be readily effected after such an application even though the electric power remains off.

While I have described my invention with particular reference to two specific embodiments thereof it is not my intention to be limited to these embodiments or otherwise than by the spirit and scope of the appended claims.

Having now described my invention, what I claim as new and desire to secure by Letters Patent, is:

1. A vehicle brake system comprising, in combination, at least one magnetic track brake device and at least one fluid pressure operated device for operating wheel brakes, control means for limiting to a moderate value the pressure of fluid supplied to operate said fluid pressure device so long as electric power is available to operate the magnetic track brake device, and means automatically operable to instantly make available fluid at a greatly increased pressure upon failure of the electric power.

2. In a vehicle brake equipment, in combination, an electric brake system, a fluid pressure brake system, means for establishing fluid pressures below a limited value for effecting the operation of said magnetic track brake system and said fluid pressure brake system to produce a braking effect, and means operable in response to failure of the electric power provided for energizing the electric brake system for establishing fluid pressures above said limiting value so as to provide for an increased degree of braking by said fluid pressure brake system to at least partially compensate for the loss of braking by said electric brake system.

3. In a vehicle brake system, in combination, a brake cylinder, a magnetic track brake device, a fluid pressure operated current controlling device for controlling the energization of said magnetic track brake device from a source of electric power, a pipe through which fluid under pressure is supplied to said brake cylinder and to said fluid pressure operated current controlling device, means operable to limit the maximum degree of fluid under pressure supplied through said pipe when making either service or emergency applications of the brakes, and means operative upon a failure of the electric power for making available fluid under pressure to a greatly increased degree.

4. In a vehicle brake system, in combination, a brake cylinder, a magnetic track brake device, a power circuit for supplying current to energize said magnetic track brake device, means for supplying fluid under pressure to said brake cylinder to establish brake cylinder pressures up to a chosen value, and electroresponsive means operable upon deenergization of said power circuit for making available fluid at an increased pressure whereby brake cylinder pressures may be established above said chosen value.

5. In a vehicle brake system, in combination, a brake cylinder, an electric brake device, a source of current supply for said electric brake device, means for supplying fluid under pressure to said brake cylinder to effect a normal application of the brakes, a limiting valve device for limiting the maximum pressure of fluid thus supplied to said brake cylinder, and means operative upon a failure of said current supply for establishing a by-pass communication around said limiting valve device whereby fluid at an increased maximum pressure may flow to said brake cylinder.

6. In a vehicle brake system, in combination, a brake cylinder, a valve device operable to supply fluid under pressure to said brake cylinder, a pressure limiting valve device for limiting the pressure of fluid supplied by said first mentioned valve device to said brake cylinder, an electric supply circuit for supplying current to operate an electric brake device, and electroresponsive means operable upon deenergization of said supply circuit for making available for supply to said brake cylinder fluid at a pressure greater than permitted by said limiting valve device.

7. In a vehicle brake system, in combination, a brake cylinder, valve means for supplying fluid under pressure to said brake cylinder, a limiting valve device for limiting the pressure of fluid thus supplied to said brake cylinder, a compensating valve device operable to make available fluid at an increased pressure for supply to said brake cylinder, and a magnet valve device operable when deenergized to effect operation of said compensating valve device to make available said supply at said higher pressure.

8. In a vehicle brake system, in combination, a brake cylinder, a main reservoir, a valve device for supplying fluid under pressure to said brake cylinder, means establishing a communication through which said valve device supplies fluid under pressure from said main reservoir to said brake cylinder to a limited maximum degree only, a magnet valve device operable to open a communication through which fluid at main reservoir pressure is made available for supply by said valve device to said brake cylinder, and a compensating valve device controlled in part by brake cylinder pressure and in part by main reservoir pressure for controlling the operation of said relay valve device.

9. In a vehicle brake system, in combination, a brake cylinder, an electric brake device, a source of current supply for said electric brake device, a relay valve device for controlling the supply of fluid under pressure to and its release from said brake cylinder, a main reservoir, a pressure limiting valve device for controlling a communication through which said relay valve device supplies fluid under pressure from said main reservoir to said brake cylinder, said pressure limiting valve device limiting the pressure of fluid thus supplied to a moderate value and less than main reservoir pressure, electroresponsive means operable to establish a different communication through which fluid at substantially main reservoir pressure is adapted to be supplied to said brake cylinder by said relay valve device, and a compensating valve device controlled in part by brake cylinder pressure and in part by said magnet valve device for controlling the operation of said relay valve device.

10. In a vehicle brake system, in combination, a brake cylinder, a relay valve device having a chamber from which fluid under pressure may be supplied to said brake cylinder and having also valve means for opening communication between said chamber and said brake cylinder, a source of fluid under pressure, means establishing a communication between said source and said relay valve chamber and being operable to limit the pressure of fluid supplied through said communication to a chosen value, electroresponsive means operable when deenergized to supply fluid at a pressure higher than said chosen value to said chamber, and a valve device controlled in part by brake cylinder pressure and in part by the pressure of fluid at said higher pressure for controlling the operation of said relay valve means to establish a brake cylinder pressure corresponding to said higher pressure.

11. In a vehicle brake equipment, in combination, a fluid pressure brake system having a normally charged pipe and means operated upon a reduction of pressure in said pipe for effecting an application of the fluid pressure brakes, an electric brake system having a source of electric power supply, a pressure limiting valve device for limiting the pressure of fluid available for effecting normal applications of the fluid pressure brakes, and means operable upon a failure of the electric power supply and a reduction of pressure in said normally charged pipe for establishing a by-pass communication around said pressure limiting valve device through which fluid at a higher pressure may flow to provide an increased degree of application of the fluid pressure brakes.

12. In a vehicle brake system, in combination, a brake cylinder, a pressure limiting valve device for establishing a communication through which fluid at a limited maximum pressure may flow, valve means for supplying fluid under pressure from said communication to said brake cylinder, a normally charged pipe, a normally energized magnet valve device, and means operable upon deenergization of said magnet valve device and a reduction of pressure in said normally charged pipe for supplying fluid under pressure to said communication to a degree higher than permitted by said pressure limiting valve device.

13. In a vehicle brake system, in combination, a brake cylinder, an automatic valve device operable upon a reduction of fluid pressure therein to effect a supply of fluid under pressure to said brake cylinder, a valve device for limiting the pressure of fluid thus supplied to the brake cylinder, and electrically controlled means operable when deenergized and upon reduction of pressure in said automatic valve device for increasing the degree of fluid under pressure supplied to said brake cylinder.

CLYDE C. FARMER.